(12) United States Patent
Alexander et al.

(10) Patent No.: US 7,165,486 B2
(45) Date of Patent: *Jan. 23, 2007

(54) APPARATUS AND METHOD FOR HYDRAULICALLY CONTROLLING A VEHICLE RESTRAINT

(75) Inventors: James C. Alexander, Ontario (CA); James R. Weber, Wind Lake, WI (US)

(73) Assignee: SPX Corporation, Charlotte, NC (US)

( * ) Notice: Subject to any disclaimer, the term of this patent is extended or adjusted under 35 U.S.C. 154(b) by 388 days.

This patent is subject to a terminal disclaimer.

(21) Appl. No.: 10/254,639

(22) Filed: Sep. 26, 2002

(65) Prior Publication Data

US 2004/0062628 A1  Apr. 1, 2004

(51) Int. Cl.
*F15B 11/00* (2006.01)
*F15B 13/00* (2006.01)
*B65G 67/00* (2006.01)

(52) U.S. Cl. ........................................ 91/530; 414/401

(58) Field of Classification Search ................ 414/396, 414/584, 401; 137/596.13, 596.16, 596.18, 137/884; 60/422, 452; 91/446, 518, 532, 91/466, 530, 531, 469
See application file for complete search history.

(56) References Cited

U.S. PATENT DOCUMENTS

| | | | | |
|---|---|---|---|---|
| 3,693,506 A | * | 9/1972 | McMillen et al. ............. 91/528 |
| 3,976,097 A | * | 8/1976 | Brakel .................... 137/596.13 |
| 4,096,880 A | * | 6/1978 | Lemmon et al. ......... 137/454.2 |
| 4,469,594 A | * | 9/1984 | Poetter ....................... 210/108 |
| 4,560,315 A | * | 12/1985 | Hahn .......................... 414/401 |
| 4,638,886 A | * | 1/1987 | Marietta ..................... 187/215 |
| 4,674,941 A | * | 6/1987 | Hageman .................... 414/401 |
| 4,865,508 A | * | 9/1989 | Carlson ....................... 414/401 |
| 5,115,720 A | * | 5/1992 | Babson et al. ................ 91/448 |
| 5,120,181 A | * | 6/1992 | Alexander ................... 414/401 |
| 5,136,930 A | * | 8/1992 | Karakama et al. ............ 91/454 |
| 5,207,059 A | * | 5/1993 | Schexnayder ................ 60/465 |
| 5,505,575 A | * | 4/1996 | Alexander ................... 414/401 |
| 6,505,645 B1 | * | 1/2003 | Pack et al. ............. 137/596.13 |
| 6,715,402 B1 | * | 4/2004 | Pfaff et al. .................... 91/526 |
| 2003/0121258 A1 | * | 7/2003 | Yoshino ....................... 60/459 |

* cited by examiner

Primary Examiner—James W. Keenan
Assistant Examiner—Gregory Adams
(74) Attorney, Agent, or Firm—Baker & Hostetler LLP (57) ABSTRACT

A valve circuit, including a first and second circuit portion, for hydraulically controlling a loading dock vehicle restraint. The first circuit portion permits raising and lowering of the vehicle restraint. The second circuit portion permits extension and retraction of the vehicle restraint. Preferably, the first and second circuit portion are separate and are configured on the same valve block.

20 Claims, 5 Drawing Sheets

APPARATUS AND METHOD FOR HYDRAULICALLY CONTROLLING A VEHICLE RESTRAINT

PRIORITY

This application claims priority to two U.S. patent applications both entitled, "Apparatus and Method for Hydraulically Controlling a Vehicle Restraint" filed Jul. 8, 2002, having Ser. Nos. 10/189,555 and 10/189,582 respectivly, also with James C. Alexander as inventor the disclosures of which are hereby incorporated by reference.

FIELD OF THE INVENTION

The present invention relates generally to an apparatus and method for controlling a loading dock vehicle restraint. More particularly, the present invention relates to a hydraulic circuit for controlling a loading dock vehicle restraint.

BACKGROUND OF THE INVENTION

Vehicle restraints are used to restrain transport vehicles from moving away from loading docks. Typical vehicle restraints are hooks or barriers that engage the rear impact guard ("RIG"), also known as an ICC bar, of a transport vehicle. Commercial examples of this type of device are the Rite-Hite ADL series, the Kelley Star series and the Serco SL series of vehicle restraints.

Actuation of vehicle restraints can be accomplished electromechanically and hydraulically. Power Ramp "Power Hook II", the Kelley "Hidden Hook" and the Serco "SLP 2000" are commercial products that use hydraulic cylinders to position the vehicle restraint. Although electromechanical actuation of the retractable hook can lower cost, a vehicle restraint which retracts the hook hydraulically can allow the hook to retract in the operative position to reduce the distance or "running room" that the transport vehicle can move away from the dock while the restraint has engaged a vehicle. However the hydraulic control circuits of commercially available retractable-hook vehicle restraints are complex and costly.

Figure 5:
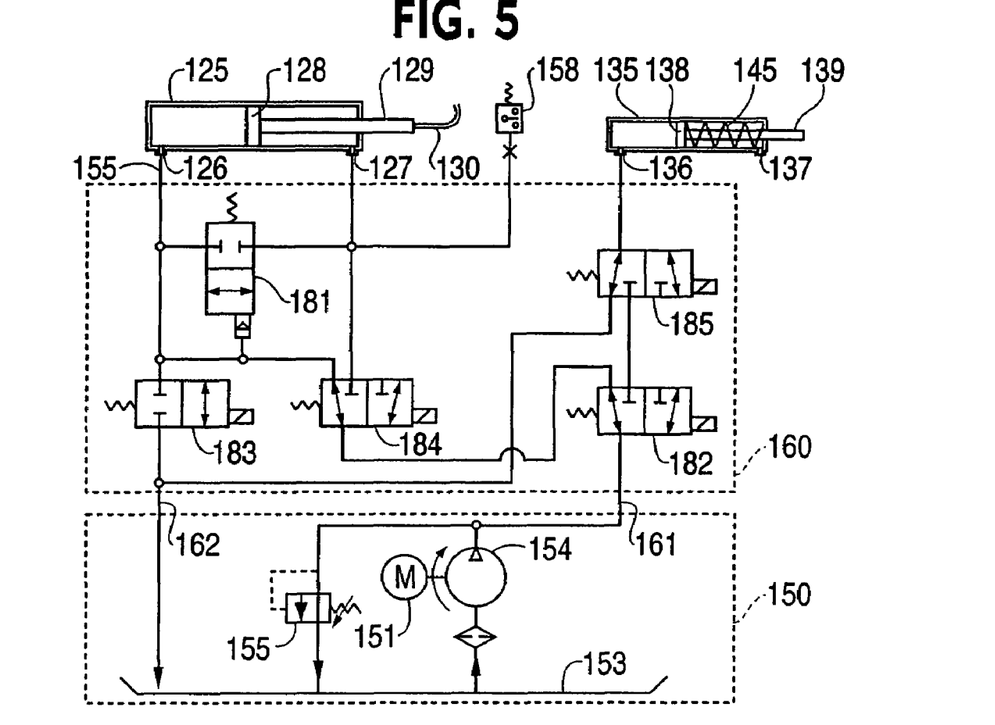
FIG. 5 is a schematic of a traditional hydraulic control circuit for a pit-mounted retractable-hook vehicle restraint, illustrating the configuration of the valves when the hook is stored and when the hook is engaging the RIG of a transport vehicle.

An example of a hydraulic control circuit for a retractable hook vehicle restraint is shown in FIG. 5. The hydraulic circuit, which includes six valves, is complex and costly. The hydraulic circuit also predominately utilizes spool valves, which have a relatively high leakage rate. Consequently, pressure may drop relatively quickly over time, thereby loosening the vehicle restraint's hold on the vehicle, or else causing the pump to run frequently to maintain pressure.

Accordingly, there is a need for an apparatus and method for controlling vehicle restraints, which can be configured on a simplified branch circuit. There is also a need for an apparatus and method for more effectively and/or efficiently restraining a vehicle from moving away from a loading dock.

SUMMARY OF THE INVENTION

The forgoing needs are met, at least in part, by the present invention, wherein in one aspect a hydraulic circuit is provided having a first circuit portion for raising and lowering a vehicle restraint and a second circuit portion for extending and retracting a vehicle restraint.

In another aspect of the invention, the first circuit portion is separate from the second circuit portion. It is understood that a first circuit portion "separate" from a second circuit portion merely implies that only valves are not shared between circuit portions, though, for example, hoses may be shared between circuit portions.

In another aspect of the invention the first circuit portion and second circuit portion consist essentially, of four valves. It is understood that "consist essentially of" or, alternatively, "consisting essentially of" implies only that the total number of valves is not so large as to require a second valve block.

In another aspect of the invention, the first circuit portion includes at least one valve operably connecting a lift mechanism to a pump and a reservoir to raise and lower the vehicle restraint, and the second circuit portion includes at least two, and preferably three, extender valves operably connecting an extender mechanism to the pump and the reservoir to extend and retract the vehicle restraint. In some embodiments at least one valve includes a first "lift valve" and at least two valves include a first, second, and third "extender" valve. In some embodiments of the invention, the first lift valve is a two-way, three-position solenoid valve, the first extender valve is a one-way check valve, and the second and third extender valves are two-position, two-way poppet solenoid valves.

In yet another aspect of the invention, a method for hydraulically controlling a vehicle restraint is provided, wherein a vehicle restraint is lowered and raised by energizing and de-energizing a first circuit portion operably connecting a lift mechanism to a pump and a reservoir, and the vehicle restraint is extended and retracted by energizing and de-energizing a second circuit portion operably connecting an extender mechanism to the pump and the reservoir.

The above and other features and advantages can be achieved, at least in part, through the use of novel hydraulic circuits as herein disclosed. In accordance with one embodiment of the present invention, a hydraulic circuit for controlling a loading dock apparatus is provided. The hydraulic circuit includes: a first circuit portion connecting a lift mechanism to a pump and a reservoir, and a second circuit portion connecting an extender mechanism to the pump and the reservoir.

In accordance with some embodiments of the invention, the hydraulic assembly includes three, optionally four valves, a first valve associated with the first circuit portion and a second, third, and optional fourth valve associated with the second circuit portion.

The first valve selectively permits fluid communication between the lift mechanism and the pump or the lift mechanism and the reservoir. When the first valve is energizing the lift mechanism permits fluid flow from the pump to the lift mechanism thereby lowering the vehicle restraint, and when the first valve is de-energized, fluid flow from the pump is blocked and fluid can flow from the lift mechanism to the reservoir thereby raising the vehicle restraint. The second valve selectively permits fluid to flow from the pump and from the rod-side of the extender mechanism to the piston-side of the extender mechanism or blocks fluid flow from the pump and the rod-side of the extender mechanism. The third valve selectively permits fluid to flow from the piston-side of the extender mechanism to the reservoir or blocks fluid flow from the piston-side of the extender mechanism. The optional fourth valve permits fluid to flow from the pump to the rod-side of the extender mechanism and to the second valve and blocks fluid flow back to the pump.

When the second and third valves are energized, fluid can flow from the pump to the extender mechanism thereby extending the vehicle restraint, and when the second and third valves are de-energized, and in cooperation with the optional fourth valve, fluid flows from the extender mechanism to the reservoir, thereby retracting the vehicle restraint.

In accordance with another embodiment of the invention, a method for hydraulically controlling a vehicle restraint is provided. The method includes: lowering a vehicle restraint by energizing a lift valve to permit fluid to flow from a pump to a lift mechanism and pumping fluid through the energized lift valve to the lift mechanism. Extending a vehicle restraint by: energizing a second extender valve to permit fluid to flow from the pump and from the rod-side of an extender mechanism to the piston-side of the extender mechanism; energizing a third extender valve to block fluid flow from the piston-side of the extender mechanism to the reservoir; and pumping fluid through an optional first extender valve to the rod-side of the extender mechanism and through the energized second extender valve to the piston-side of the extender mechanism. Raising a vehicle restraint by de-energizing the lift valve thereby permitting fluid to flow from the lift mechanism to a reservoir while simultaneously blocking fluid from the pump. Retracting a vehicle restraint by de-energizing the second and third extender valves thereby blocking fluid from through the second extender valve and permitting fluid flow from the piston-side of the extender mechanism to the reservoir.

There has thus been outlined, rather broadly, some of the features of the invention in order that the detailed description thereof that follows may be better understood, and in order that the present contribution to the art may be better appreciated. There are, of course, additional features of the invention that will be described below and which will form the subject matter of the claims appended hereto. Of course, not all features or advantages may be present in each embodiment of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides a hydraulic circuit for controlling devices that restrain vehicles from movement away from loading docks. The hydraulic circuit raises and lowers, and extends and retracts a vehicle restraint device. An example of a vehicle restraint device for which the hydraulic circuit can be adapted for use—a hook operably connected to two cylinder assemblies—is provided below, but should not be considered limiting. Similarly, the specifically described dock and dock leveler are exemplary only and should not be considered limiting.

Figure 1:
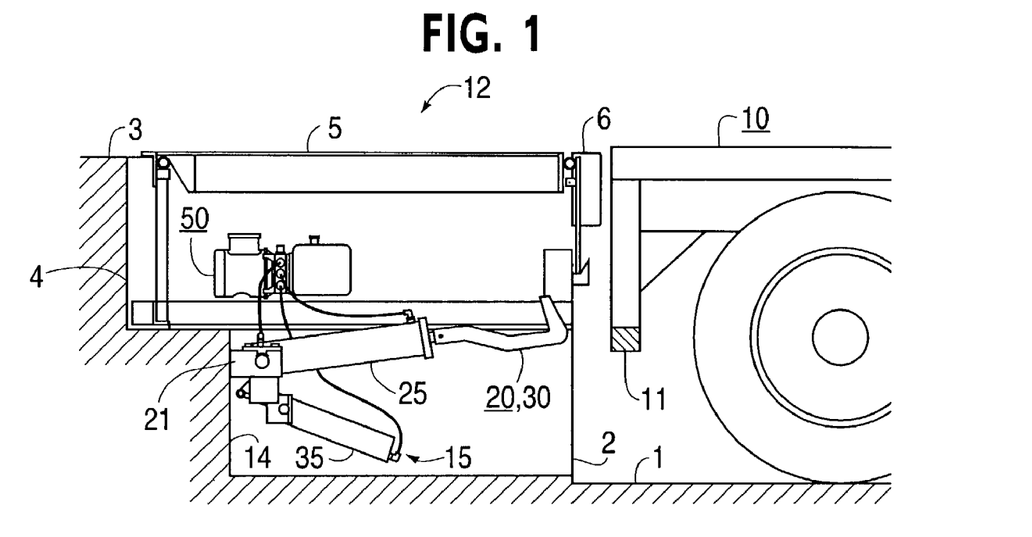
FIG. 1 is a side view of a loading dock showing the installation of a dock leveler and a pit-mounted retractable-hook vehicle restraint beneath a dock leveler, with the restraint hook in the retracted and stored position.

Referring now to the figures, wherein like reference numerals indicate like elements, FIG. 1 illustrates an exemplary loading dock 12 configured with a dock leveler 5 and a hydraulically operated vehicle restraint 20. The dock 12 further includes a dock face 2 and dock floor 3. A dock leveler 5 is installed in a pit 4 recessed below the dock floor 3. A transport vehicle 10 is parked adjacent to the dock face 2 on a driveway 1 and carries a RIG 11 (rear impact guard). Bumpers 6 are mounted to the dock face 2 to protect the dock face 2 from impact and to position the transport vehicle 10 at the desired distance from the dock face 2.

The vehicle restraint 20 is mounted in a pit 14 that is recessed below the floor of the dock leveler pit 4. The vehicle restraint has a frame assembly 21 mounted to the walls of the pit 14. The frame assembly 21 supports a hydraulic cylinder 25 by the trunion pins 24, allowing the cylinder 25 to pivot freely in a vertical plane but restraining it laterally. A second hydraulic cylinder 35 has trunion pins 34 that also engage the frame assembly 21.

Figure 2:
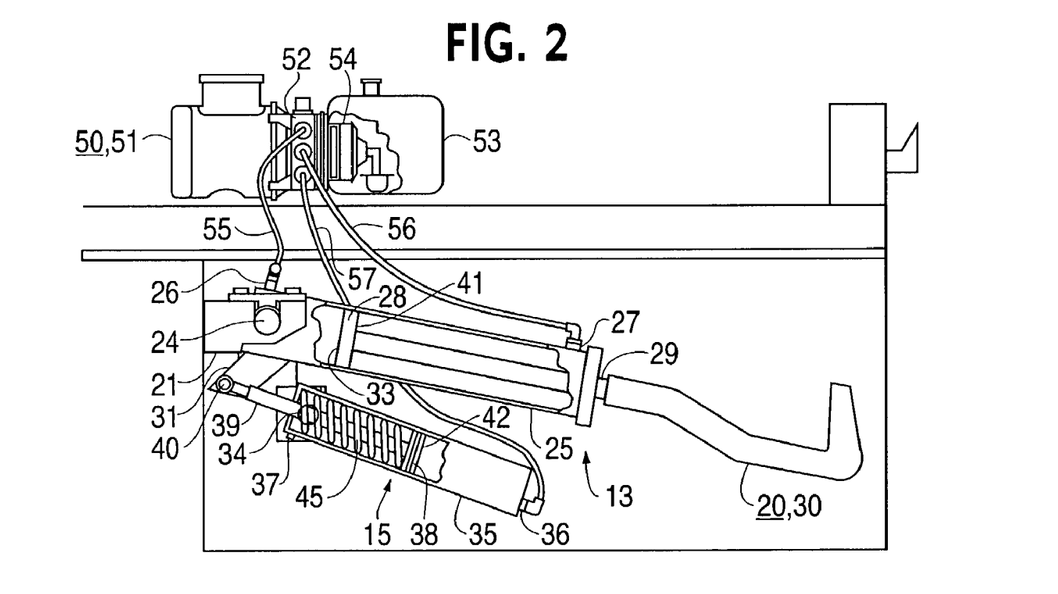
FIG. 2 is an enlarged cut-away side view of the restraint of FIG. 1, illustrating the hydraulic cylinder and spring that biases the hook cylinder upward, with the hook shown in the lowered position and the hydraulic cylinder that extends and retracts the hook.

FIG. 2 illustrates the vehicle restraint 20 in greater detail. The vehicle restraint includes an extender mechanism 13, a lift mechanism 15, a hook 30, and an actuating mechanism 50.

The extender mechanism 13 includes a cylinder 25 with two ports 26, 27 for receiving hydraulic fluid, one port 26 on a first end, or piston-side, of the cylinder 25, and one port 27 on a second end, or rod-side, of the cylinder. It is understood that when referring to "piston-side" herein, it is meant that when a piston-rod assembly are fully retracted in a cylinder, a port on the "piston-side" allows fluid to enter the cylinder so that it will be determined to the front face 33 side of the piston, as shown in the figures. It is understood that when referring to a "rod-side" herein, it is meant that when the piston rod assembly are fully extended, a port located on the "rod-side" will allow fluid to enter the cylinder and be delivered to the back-face 41 of the piston as shown in the figures. A cylinder rod 29 and piston 28 telescope within the cylinder 25. The outer end of the cylinder rod 29 carries the hook 30.

The lift mechanism 15 includes a hydraulic cylinder 35, which has trunion pins 34 that engage the frame assembly 21. A cylinder rod 39 and piston 38 telescope within the cylinder 35. The outer end of the cylinder rod 39 is pivotally attached by a pin 40 to a pair of lever arms 31 attached to the cylinder 25. A spring 45 is trapped between the piston 38 and the end of the cylinder 35 and urges the rod 39 to retract into the cylinder 35. Thus the spring 45 biases the cylinder 25 and the hook 30 toward the raised position. The cylinder 35 has two ports 36, 37, a first port 36 on the piston-side of the cylinder 35 for receiving hydraulic fluid, and a second "breather" port 37 on the rod-side of the cylinder.

The actuating mechanism 50 includes a motor 51, a valve block 52, a pump 54, and a reservoir 53. The hydraulic pump 54 is mounted to the valve block 52 within the reservoir 53. Hydraulic hoses 55, 56, 57 are attached to ports on the valve block 52 to carry hydraulic fluid under pressure to the cylinders 25 and 35. The hose 55 is attached to the port 26 of the cylinder 25, and carries fluid to the front face 33 of the piston 28. The hose 56 is attached to the port 27 of the cylinder 25, and carries fluid to the back face 41 of the piston 28. The hose 57 is attached to the port 36 of the cylinder 35 and carries fluid to the front face 42 of the piston 38. The port 37 is a "breather" port that allows air to escape from the rod-side of the cylinder 35 as the piston 38 and the rod 39 compress the spring 45 and move the vehicle restraint 20 to the lowered position.

The actuating mechanism 50 can also include an electronic control circuit, such as a PLC (programmable logic controller), for controlling the vehicle restraint 20. Limit switches sense the extended and retracted positions of the hydraulic cylinders and provide signals to the electronic controller. Such control devices and sensors are well known in the industry and will not be described in detail. A pressure switch 58 (shown in FIG. 6) closes a contact when the hydraulic pressure reaches a predetermined level. The controller receives signals from the switches and sends the appropriate signals to the motor and the valves to control the motion of the restraint.

Figure 3:
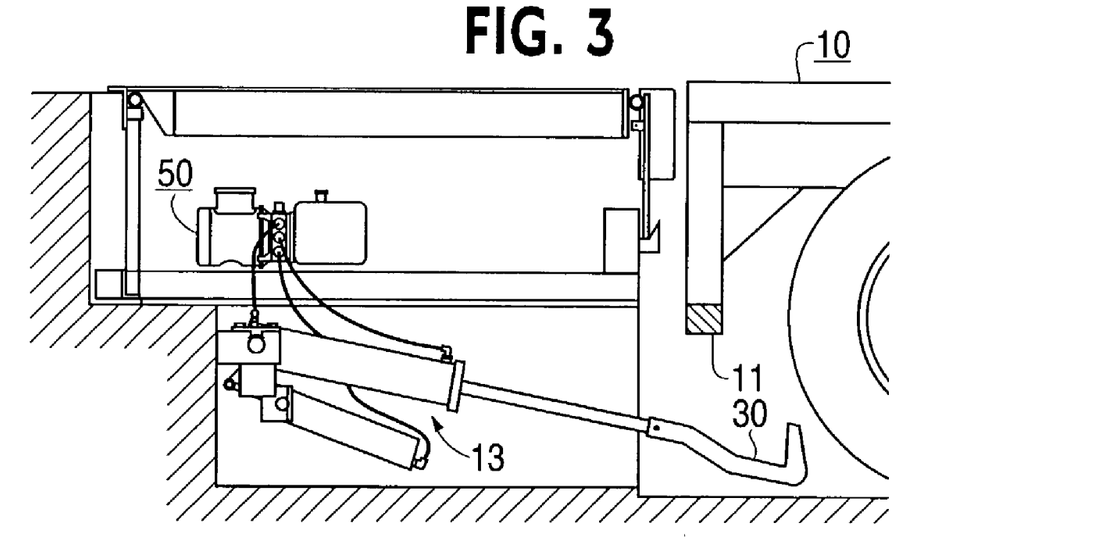
FIG. 3 is a side view of the restraint of FIG. 1, illustrating the hook lowered and extended under the RIG of a transport vehicle.
Figure 4:
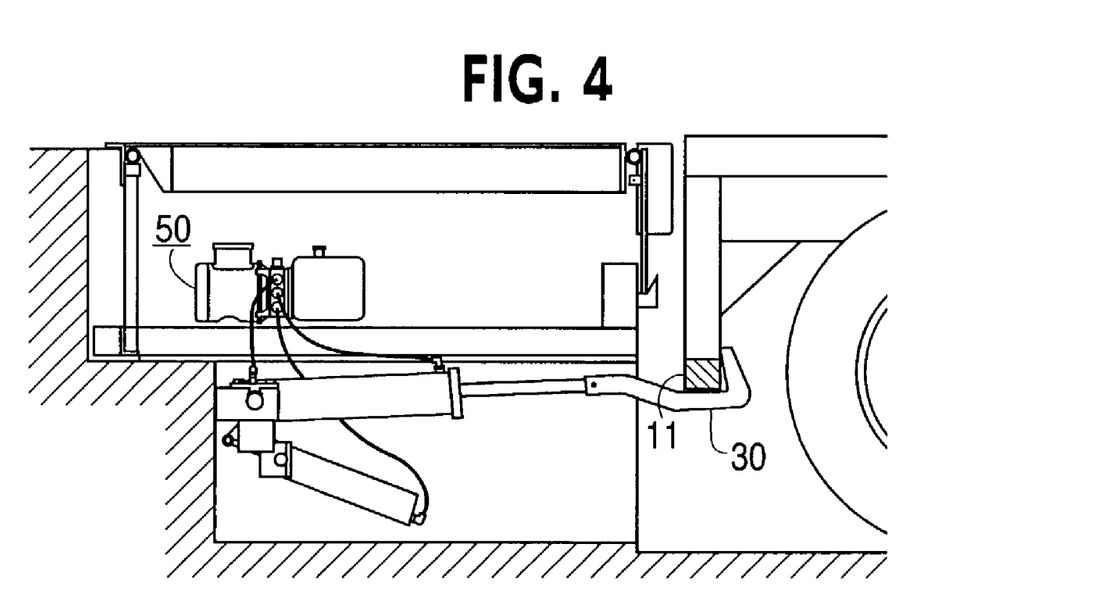
FIG. 4 is a side view of the restraint of FIG. 1, illustrating the hook in the operative position with the hook retracted against the RIG of a transport vehicle.

FIGS. 1–4 together illustrate operation of the vehicle restraint. As can be seen, four actions are performed to engage the RIG 11 with the hook 30. These are: lower the hook 30 as illustrated in FIG. 2, extend the hook under the RIG 11 as illustrated in FIG. 3, raise the hook 30 to engage the bottom of the RIG 11, and retract the hook 30 against the front of the RIG 11 to prevent motion of the transport vehicle 10 away from the dock 12 as illustrated in FIG. 4. It should be understood that the four actions may not necessarily correspond to four distinct steps. For example, the hook 30 may lower while optionally, simultaneously extending.

To lower the hook 30, pumped fluid is permitted to flow through the port 36 via the hose 57 to the front face 42 of the piston 38. Fluid pressure on the front face 42 of the piston 38 urges the rod 39 to extend, lowering the hook 30. To extend the hook 30, pumped fluid is permitted to flow through the port 26 to the front face 33 of the piston 28 via the hose 55 and through the port 27 to the back face 41 of the piston 28 via the hose 56. Because the fluid entering the port 26 acts on a larger surface area of the piston 28 than the fluid entering the port 27, the rod 29 and the hook 30 are forced to extend.

To raise the hook 30, fluid flow from the pump 54 to the lift mechanism 15 is blocked and, additionally, fluid is permitted to flow from the lift mechanism 15 to the reservoir 53. The force of the spring 45 urges the piston 38 inward, pushing the fluid out of the cylinder 35 to the reservoir 53, thereby raising the hook 30.

To retract the hook 30, fluid flow to the port 26 from the pump 54 is blocked and, additionally, fluid flow from the port 26 to the reservoir 53 is permitted. Because the fluid pressure on the back face 41 of the piston 28 now becomes greater than on the front face 33 of the piston 28, the rod 29 and the hook 30 retract.

Figure 6:
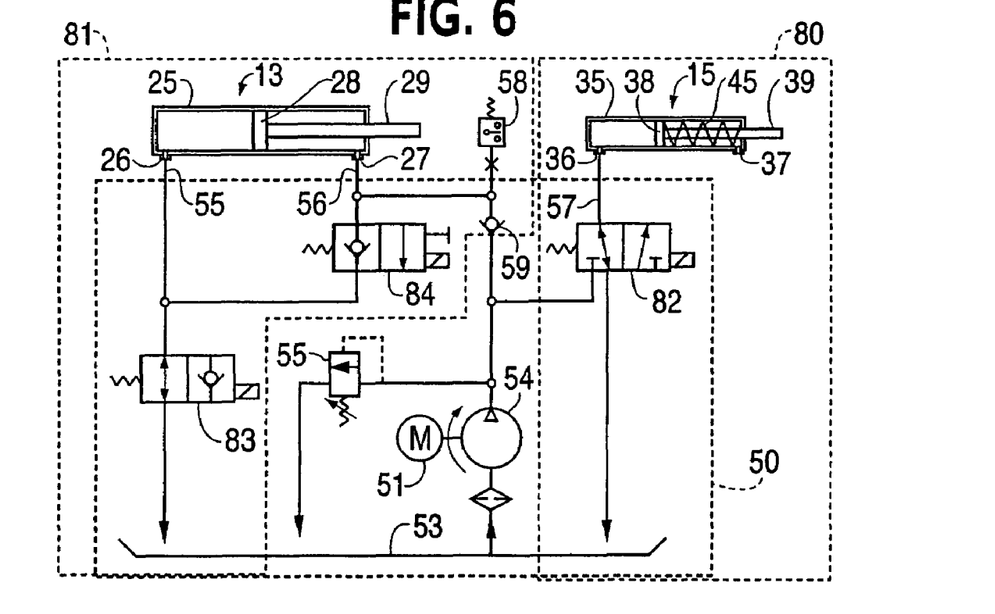
FIG. 6 is a schematic of a hydraulic control circuit of in accordance with the invention, illustrating the configuration of the valves when the hook is stored and when the hook is engaging the RIG of a transport vehicle.

FIG. 6 illustrates a hydraulic circuit in accordance with one embodiment of the invention. The hydraulic circuit includes a first circuit portion 80, which in some embodiments includes a lift valve 82 and a second circuit portion 81, which in some embodiments include a first, second, and optional third extender valve 83, 84, 59. In some embodiments the first circuit portion 80 is separate from the second circuit portion 81, as shown.

The first lift valve 82 is configured in the circuit to operably link the lift piston 38 with the pump 54 by placing the lift cylinder 35 in selective fluid communication between the pump 54 and the reservoir 53. The first lift valve 82 therefore can permit fluid to flow from the pump 54 through the first lift port 36 into the lift cylinder 35 such that fluid pressure is applied to the front face 42 of the lift piston 38 causing the hook 30 to lower. Alternatively, the first lift valve 82 can permit fluid to flow from the lift cylinder 35 into the reservoir 53, thereby relieving fluid pressure on the lift piston 38 causing the hook to be raised due to the biasing action of the spring 45.

Figure 9:
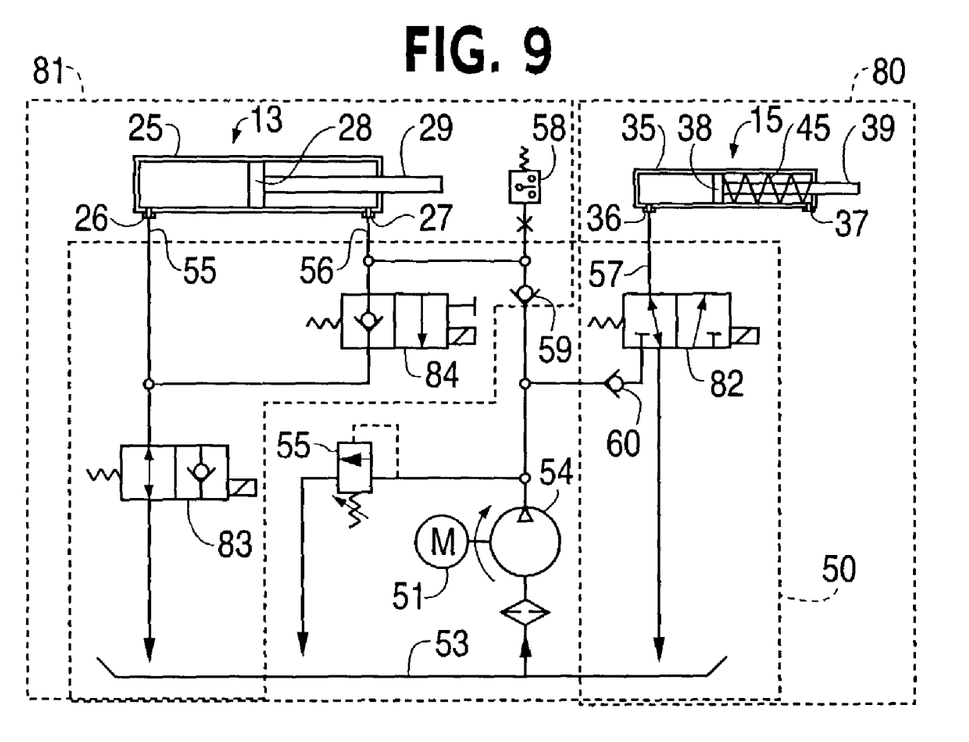
FIG. 9 is a schematic of a hydraulic control circuit having an additional optional valve.

In some embodiments, the lift valve 82 is a solenoid valve. In some embodiments the lift valve 82 is a two-way, three position valve. In some embodiments, as shown in FIG. 9, a second lift valve 60 may be employed in the circuit portion 80 before the lift valve 82. This second lift valve may be a one-way valve configured to permit fluid to flow to valve 82.

In some embodiments of the invention, it may be possible for hydraulic fluid to flow from circuit portion 80 to circuit portion 81 when such flow is not desirable. This undesired flow, referred to as back flow, may occur when valve 82 is configured to provide fluid communication between the pump 54 and the cylinder 35. In some instances, back flow, possibly caused by the spring 45 urging piston 38, may occur through valve 82 causing fluid to flow from circuit portion 80 to circuit portion 81. Back flow may have undesired consequences in the circuit. To reduce or eliminate the possible back flow, an optional valve 60 may be placed in circuit portion 80 before, as shown in FIG. 9, valve 82. Valve 60 may be a one-way valve.

The first and second extender valves 84, 83 are configured in the circuit to operably link the pump 54 to the extender piston 28 by placing the extender cylinder 25 in selective fluid communication with the reservoir 53. A prefered embodiment includes the optional third extender valve 59, which permits fluid to flow from the pump 54 to the first extender valve 84 and also through the rod-side extender port 27 to the back-face 41 of the piston 28 in the extender cylinder 25, but blocks fluid from flowing back to the pump 54. In some embodiments, the third extender valve 59 is a two-position valve, which selectively permits fluid to flow between the pump 54 and the extender cylinder 25. In some embodiments, the third extender valve 59 is one-way, or check, valve.

The first extender valve 84 selectively permits fluid to flow through it. When the first extender valve 84 is energized, fluid flows through it to the piston-side port 26 and to the second extender valve 83. In its de-energized state, the first extender valve 84 blocks fluid flow from the pump 54 and from rod-side extender port 27 to the piston-side extender port 26 and the second extender valve 83.

The second extender valve 83 selectively permits fluid to flow through it. When the second extender valve 83 is de-energized, fluid flows through it to the reservoir 53. In its energized state, the second extender valve 83 blocks fluid flow to the reservoir.

First and second extender valves 84, 83 may be poppet valves. Using poppet valves rather than spool valves may provide the following advantage. Hydraulic valves have some leakage under pressure. By nature of their construction, spool valves have leakage rates that are higher than poppet valves and check valves. The prior art circuit shown in FIG. 5 requires a two position, three-way valve 184 to block the port 127 of the cylinder 125. This valve is available only in a spool valve configuration. Because of the higher leakage rate, either pressure drops more quickly over time in the cylinder 25, thus loosening the vehicle restraint's hold on the vehicle, or the pump must run frequently to maintain the pressure.

Some embodiments of the invention may include a pressure switch 58. In circuits containing a pressure switch 58, the pressure switch 58 may be used to sense whether the hook 30 continues to exert force against the RIG 11. This feature maintains a "zero running room" condition. If the transport vehicle 10 is not in contact with the dock bumpers 6 when initially parked, it-will be jostled during the loading process and may momentarily move rearward away from the hook 30. The pressure switch 58 will sense if there is still force exerted against the RIG 11. If the force drops below a predetermined level, the motor 51 and the pump 54 may be started and the pressure in the circuit increased to bring the hook 30 into contact with the RIG 11.

A further advantage of some embodiments of the present invention is that the hook 30 may be manually released. In the event of a power failure, the transport vehicle 10 may be released from the dock. In the prior art hydraulic control circuit both valves 183 and 184 must be energized to allow hydraulic pressure to be released from the cylinder 125 to the reservoir 153. In some embodiments according to the present invention, the second extender valve 83 is equipped with a manual operator that can used to open the valve and allow hydraulic pressure be released from the cylinder 25 to the reservoir 53.

Figure 7:
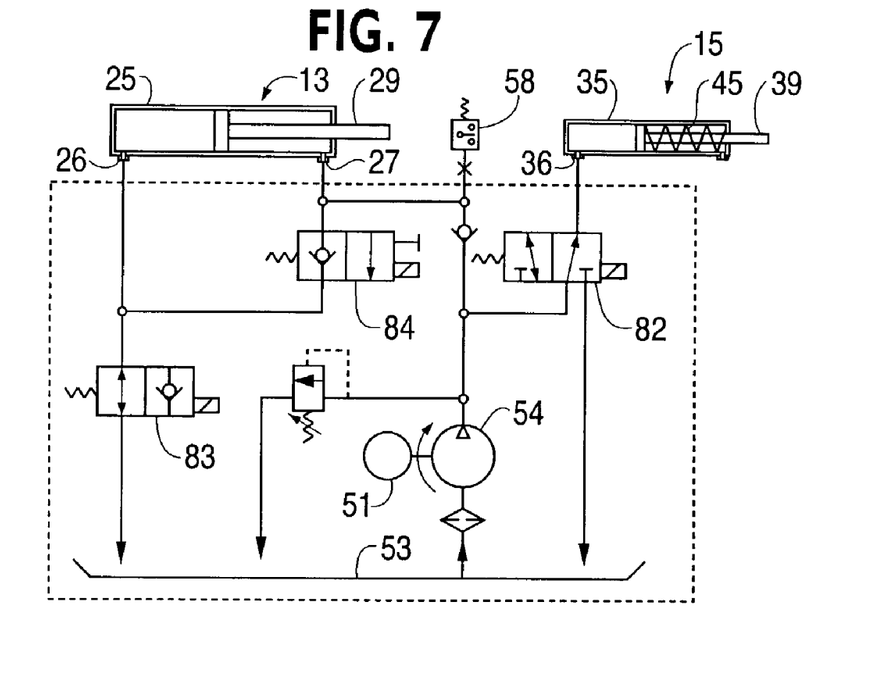
FIG. 7 is a schematic of the hydraulic control circuit FIG. 6, illustrating the configuration of the valves when the hook is being lowered from the stored position.
Figure 8:
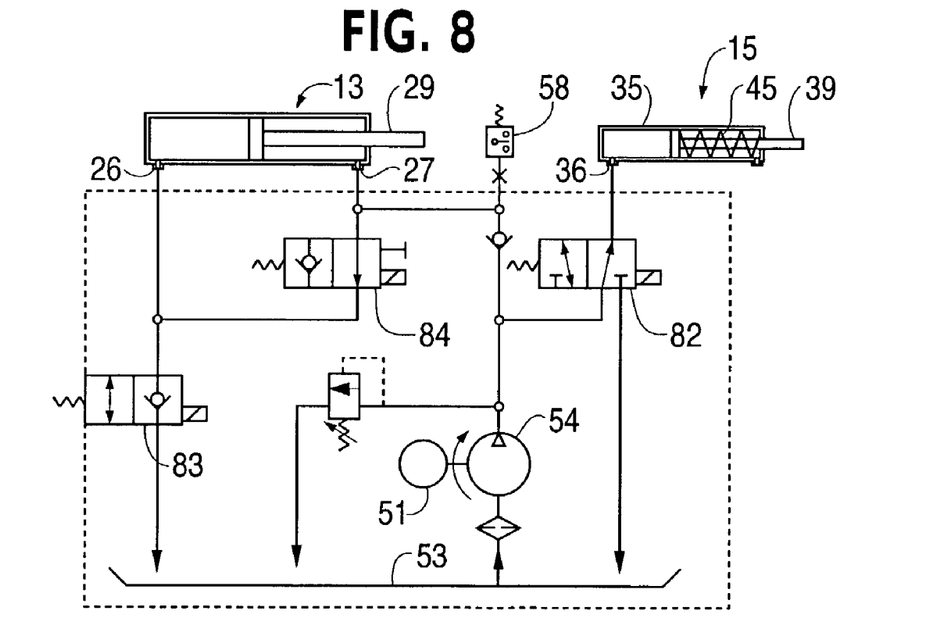
FIG. 8 is a schematic of the hydraulic control circuit of FIG. 6, illustrating the configuration of the valves when the hook is being extended in the lowered position.

FIGS. 6–8 together illustrate operation of the hydraulic circuit to permit raising and lowering and retracting the hook 30. FIG. 6 illustrates the "normal" or "de-energized" state of the system. In this state, the pump 54 is not operating the first extender valve 84 and the one-way valve 59 block fluid flow from the rod-side port 27 of the cylinder 25 and prevent the hook 30 attached to the rod 29 from extending as shown in FIG. 6.

As shown in FIG. 7, to begin the first step of engaging a transport vehicle, the motor 51 and the pump 54 start and the valve 82 is energized.

Consequently, hydraulic fluid is directed through the lift valve 82 and the piston-side port 36 into the cylinder 35 to the front face 42 of the piston 38, causing the piston 38 to compress the spring 45, and the cylinder rod 39 to extend, thereby rotating the cylinder 25 rotates and lowering the hook 30 as illustrated in FIG. 2. At the same time, hydraulic fluid pressure is directed through the check valve 59 to the rod-side port 27 of the hydraulic cylinder 25, causing the hook 30 to remain in the retracted position. The position of the piston 28 in the cylinder 25 when the hook is in a retracted position is referred to herein as the "rest position."

Next, as shown in FIG. 8, when the hook 30 is fully lowered, the lift valve 82 remains energized, and the first and second extender valves 84, 83 are both energized. While the valves 82, 83, 84 are all in an energized state, hydraulic fluid is directed to both the rod-side 27 and piston-side 26 ports of the cylinder 25. Because the fluid entering the piston-side port 26 acts on a larger surface area of the piston 28 than the fluid entering the rod-side port 27, the rod 29 and the hook 30 are forced to extend.

As shown in FIG. 6, when the hook 30 has fully extended under the RIG. 11, the lift valve 82 and first and second extender valves 84, 83 are returned to their normal, or de-energized, state, and the motor 51 and the pump 54 stop. Consequently, force exerted by the spring 45 urges fluid from the cylinder 35 to the reservoir 53 and the hook 30 is raised against the bottom of the RIG 11.

After a predetermined delay period, the motor 51 and the pump 54 re-start and fluid is directed to the rod-side port 27 of the hydraulic cylinder 25 to retract the rod 29 and the hook 30. The pressure switch 58 senses when the hook 30 has exerted a predetermined pressure against the RIG 11 and the motor 51 stops. Thus, the hook 30 is retracted against the RIG 11 and the transport vehicle 10 is restrained against the dock bumpers 6.

The hydraulic circuit performs the opposite steps to restore the hook 30 to the retracted position. The hook 30 is extended, lowered, retracted and raised. All three solenoid valves 82, 83, 84 are energized as illustrated in FIG. 8. The hydraulic fluid pressure causes the cylinder rod 29 and the hook 30 to extend and also causes the rod 39 to extend and the hook 30 to lower. When the hook 30 is fully lowered, the first and second extender 84, 83 valves are de-energized as shown in FIG. 7 and the cylinder rod 29 and the hook 30 retracts. When the hook 30 is fully retracted, the motor 51 stops, the lift valve 82 is de-energized as shown in FIG. 6, and the spring 45 causes the hook 30 to raise to the stored position.

Another aspect of the invention includes a method of operating a vehicle restraint system. The method includes: providing a first circuit portion for raising and lowering a vehicle restraint, providing a second circuit portion for extending and retracting a vehicle restraint, and configuring the first circuit portion and the second circuit portion on a single valve block.

The method may also include returning the extender to the rest position by actuating the second valve to cut off at least part of a piston from system pressure and flowing hydraulic fluid from the second cylinder through a third valve to a reservoir. Some embodiments of the invention may include moving additional restraining apparatus by moving a piston away from a rest position by exposing the piston to system pressure by actuating a second valve including flowing hydraulic fluid through a first inlet valve into a chamber defined at least in part by a first side of the piston, a shaft attached to the piston, and the cylinder and flowing hydraulic fluid through a second inlet valve into a chamber defined at least in part by a second side of the piston and the cylinder wherein when system pressure is applied through both inlet valves, the piston will travel away from the rest position, when the system pressure is applied to only the first inlet valve, the piston will move toward the rest position. The method may also include biasing the piston to the rest position with a spring. When practicing the method, sometimes the second valve, when not in an energized state, will not permit hydraulic fluid to flow through it. When practicing the method, sometimes the piston is in the rest position and a restraining hook associated with a vehicle restraint apparatus is in a retracted position. Optionally, the method may include manually releasing a hook portion of the restraining apparatus.

Modifications of this invention may be practiced without departing from this invention. The lift circuit portion may include two lift valves, cooperating with two piston-side ports. The first lift valve selectively permits fluid to flow to the first piston-side port from the pump, and the second lift valve selectively, permits fluid to flow from the cylinder to the reservoir. For example, the embodiment as illustrated in schematic of FIGS. 6–8 has the hydraulic control circuit combined with the pump and motor in a single unit. The hydraulic control circuit may also be contained in a valve block with a separate motor and pump connected by hoses to the vehicle restraint valves. Hydraulic fluid power may also be derived from the pump and motor used to operate a hydraulic dock leveler, with the fluid diverted by suitable valves. Also the piston 28 and cylinder 25 could be reconfigured to have only an inlet 26 and be biased with a spring similar to spring 45. The lift and extender are not limited to have to include pistons and cylinders but may incorporate any devices that can perform similar functions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle restraint valve block system, comprising:
    a first valve operably connecting a lift mechanism to a pump and a reservoir to raise and lower a vehicle restraint, wherein the first valve is the only valve in the valve block system that selectively permits fluid communication between the lift mechanism and the pump or the lift mechanism and the reservoir;
    a second, third, and fourth valve, which together operably connect an extender mechanism to the pump and the reservoir to extend and retract the vehicle restraint, wherein the second valve is a one-way check valve and the third and fourth valves are two-way, two-position poppet valves; and
    a fifth valve that permits fluid to flow from the pump to the first valve but blocks fluid flow from the first valve back to the pump, wherein the fifth valve is a one-way check valve and the first, second, third, fourth and fifth valves are configured in a single valve block.

2. A valve block system according to claim 1, wherein the second valve permits fluid to flow from the pump but blocks fluid flow back to the pump; the third valve selectively permits fluid to flow from the pump and from a first end of the extender mechanism to a second end of the extender mechanism or blocks fluid flow from the pump and the first end of the extender mechanism; and, the fourth valve selectively permits fluid to flow from the second end of the extender mechanism to the reservoir or blocks fluid flow from the second end of the extender mechanism.

3. A hydraulic circuit for controlling a vehicle restraint apparatus, comprising:
    a first circuit portion operably connecting a lift mechanism to a pump and a reservoir to raise and lower a vehicle restraint, the first circuit portion comprising:
        a three-way, two-position solenoid valve that alone selectively permits fluid communication between the lift mechanism and the pump or the lift mechanism and the reservoir, and
        a one-way check valve that permits fluid to flow from the pump to the solenoid valve but blocks fluid flow from the solenoid valve back to the pump; and
    a separate second circuit portion, operably connecting an extender mechanism to a pump and a reservoir to extend and retract the vehicle restraint.

4. A hydraulic circuit according to claim 3, wherein a first extender valve permits fluid to flow from the pump but blocks fluid flow back to the pump; a second extender valve selectively permits fluid to flow from the pump and from a first end of the extender mechanism to a second end of the extender mechanism or blocks fluid flow from the pump and the first end of the extender mechanism; and, a third extender valve selectively permits fluid to flow from the second end of the extender mechanism to the reservoir or blocks fluid flow from the second end of the extender mechanism.

5. A hydraulic circuit according to claim 4, wherein the first extender valve is a one-way check valve, and the second and third extender valves are two-way, two-position poppet valves.

6. A valve block circuit assembly for hydraulically controlling a vehicle restraint apparatus, comprising:
    a first valve means for raising and lowering a vehicle restraint; and
    a second valve means for extending and retracting the vehicle restraint;
    wherein the first valve means comprises a lift valve operably connecting a lift mechanism to a pump and a reservoir to raise and lower a vehicle restraint, and the second valve means comprises a first, second, and third extender valve, operably connecting an extender mechanism to the pump and the reservoir to extend and raise the vehicle restraint mechanism; and
    the lift valve is a three-way, two-position solenoid valve.

7. The valve block circuit of claim 6, wherein the first extender valve is a one-way check valve, and the second and third extender valves are two-way, two-position solenoid valves.

8. The valve block circuit of claim 6, wherein the second and third extender valves further are poppet valves.

9. The valve block circuit of claim 6, wherein the first valve means further comprises a one-way check valve between the pump and the lift valve that permits fluid to flow from the pump to the lift valve but blocks fluid flow from the lift valve back to the pump.

10. The valve block circuit of claim 6, wherein the second valve means further comprises a manual release for manually releasing the vehicle restraint apparatus.

11. The valve block circuit of claim 6, further comprising a sensor configured to sense a force associated with the vehicle restraint apparatus urging against a vehicle.

12. The valve block circuit of claim 11, wherein the sensor is configured send a signal to the pump to start pumping if the force is below a predetermined level.

13. The valve block circuit of claim 6, wherein the vehicle restraint is biased to a raised position.

14. The valve block circuit of claim 6, wherein the first valve means consists essentially of the lift valve and the second valve means consists essentially of the first, second, and third extender valves.

15. The valve block circuit of claim 6, wherein the first valve means consists essentially of the lift valve and a check valve, and the second valve means consists essentially of the first, second, and third extender valves.

16. The valve block circuit of claim 6, wherein the first valve means selectively permits fluid communication between the lift mechanism and the pump or the lift mechanism and the reservoir.

17. The valve block circuit of claim 6, wherein the second valve means permits fluid to flow from the pump but blocks fluid flow back to the pump; selectively permits fluid to flow from the pump and from a first end of the extender mechanism to a second end of the extender mechanism or blocks fluid flow from the pump and the first end of the extender mechanism; and, selectively permits fluid to flow from the second end of the extender mechanism to the reservoir or blocks fluid flow from the second end of the extender mechanism.

18. A valve block circuit assembly for hydraulically controlling a vehicle restraint apparatus, comprising:

a first valve means for raising and lowering a vehicle restraint; and a second valve means for extending and retracting the vehicle restraint;

wherein the first valve means comprises a lift valve operably connecting a lift mechanism to a pump and a reservoir to raise and lower a vehicle restraint, and the second valve means comprises a first, second, and third extender valve, operably connecting an extender mechanism to the pump and the reservoir to extend and raise the vehicle restraint mechanism; and the first extender valve is a one-way check valve, and the second and third extender valves are two-way, two-position solenoid valves.

19. The valve block circuit of claim 18, wherein the second and third extender valves further are poppet valves.

20. The valve block circuit of claim 18, wherein the first valve means further comprises a one-way check valve between the pump and the lift valve that permits fluid to flow from the pump to the lift valve but blocks fluid flow from the lift valve back to the pump.

* * * * *